Feb. 18, 1936. G. A. SPILLER 2,031,184
BRAKE HEAD
Filed July 5, 1934 2 Sheets-Sheet 1
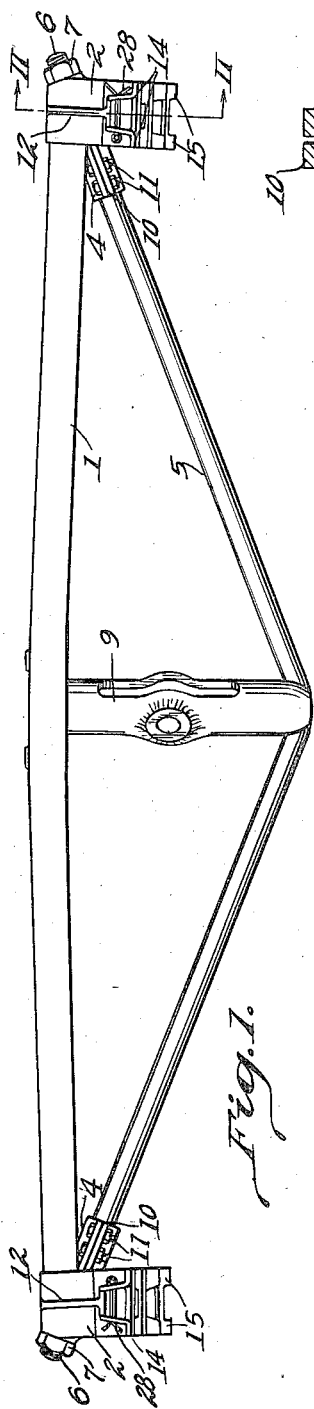
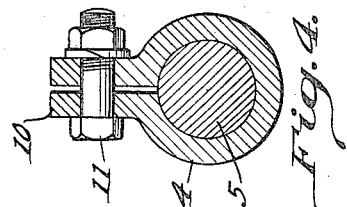
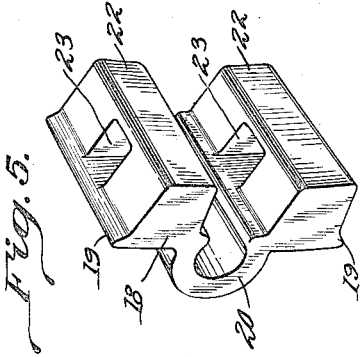
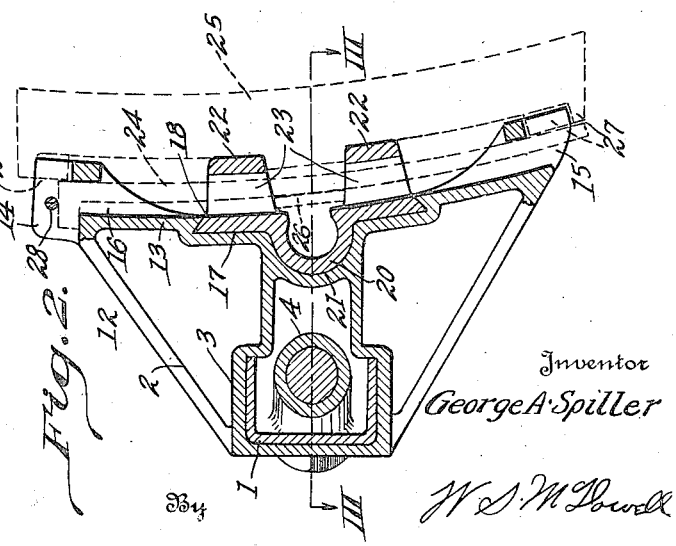
Inventor
George A. Spiller
By W. S. McDowell
Attorney

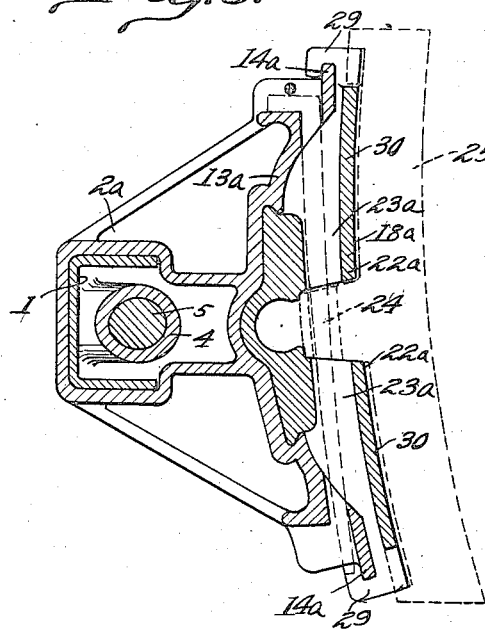
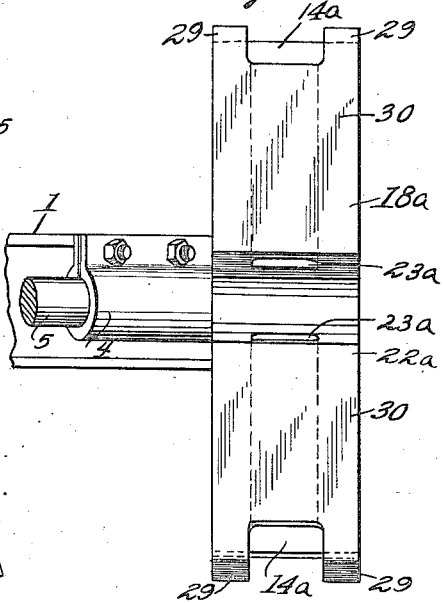
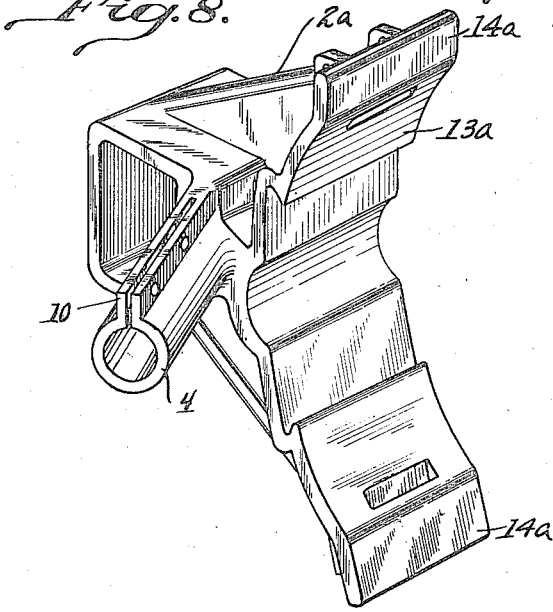
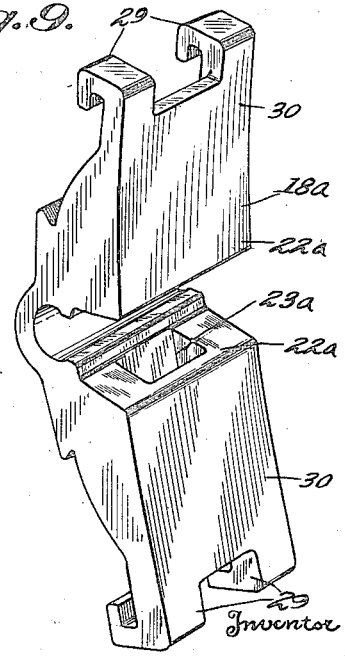

Patented Feb. 18, 1936

2,031,184

UNITED STATES PATENT OFFICE 2,031,184

BRAKE HEAD

George A. Spiller, Columbus, Ohio

Application July 5, 1934, Serial No. 733,702

10 Claims. (Cl. 188—236)

This invention relates to brake heads of the type used in connection with the rolling stock of railroads. The standard type of brake head which is in use on practically all American railroads comprises a body formed with a forwardly disposed arcuate surface which is provided centrally with integral upper and lower spaced lugs and confined between these lugs to engage with the arcuate surface of the brake head is the separable brake shoe, the latter being held in connection with the brake head by means of an arcuate locking key, which passes through spaced and registering openings formed in said lugs and in the rear surface of the brake shoe.

A large percentage of the brake beam failures on railroad cars is attributable to the wear which takes place between the meeting surfaces of the brake head and brake shoe. This wear is particularly noticeable on the lower lug of the brake head, due undoubtedly to the complex forces and pressures which are set up by the intermittent engagement of the brake shoe with the car wheels. Frequently, this wear becomes so pronounced that it necessitates the removal of the car from service and the brake beams with defective heads must be removed and other brake beams substituted for them. Under the present practice, it is necessary to remove a defective brake head from its position of attachment with the brake beam and associated tension rod and frequently the wear on one lug of a brake head may be such that the entire brake head must be discarded, since the lugs are integrally formed, in the standard American Railway Association design, with the body of the brake head.

It is, therefore, one of the outstanding objects of the present invention to provide a brake head which conforms closely to and may be used interchangeably with brake beams and torsion rods of standard design but wherein provision is made for separably and readily connecting with the brake head a removable insert section with which an associated brake shoe of standard design may be detachably connected, the said insert section including the spaced lugs with which the back of a brake shoe is adapted to be connected, the construction being such that when the lugs of the insert section become worn, the entire insert section may be readily removed from the side of the car or truck without removing the main body of the brake head from its connected relationship with the associated brake beam and tension rod, to the end of permitting repairs to be made quickly and economically without removing a car from service and to avoid waste incident to the dismantling and discarding of a brake head when but a relatively small area thereof has become unduly worn.

It is another object of the invention to form the insert section so that it may be connected with or removed from the main body of an associated brake head from the outer side of the brake head, the insert section being held in its operative position in connection with the brake head by means of the usual wedge key used in uniting the brake shoe with the brake head and also by the provision of a novel socket construction formed in the brake head and in which enlargements provided in connection with the rear part of the insert section are received.

A further object of the invention is to provide the main body of the brake head with a split sleeve in which an end of the tension rod of the brake beam assembly is adapted to be frictionally clamped, whereby in the event of injury or breakage of the usual threaded connection, employed in uniting the ends of the tension rod with the brake beam and the brake heads, means are provided for maintaining said rod under tension until suitable repairs can be made at an appropriate time.

For a further understanding of the invention, reference is to be had to the following description and the accompanying drawings, wherein:

Fig. 1 is a top plan view of the brake beam assembly provided with the brake heads formed in accordance with the present invention;

Fig. 2 is a vertical sectional view taken through the brake head and associated parts on the plane indicated by the line II—II of Fig. 1;

Fig. 3 is a horizontal sectional view taken through the brake head and its associated parts, the plane of the section being indicated by the line III—III of Fig. 2;

Fig. 4 is a transverse cross sectional view on the line IV—IV of Fig. 3 and disclosing the frictional clamp engagement between my improved brake head and an associated torsion rod;

Fig. 5 is a detailed perspective view of the renewal insert employed by the brake head comprising the present invention;

Fig. 6 is a vertical transverse sectional view taken through another form of brake head embodying the features of the present invention and wherein the renewable insert section is of extended form to receive the entire wear which takes place between the brake shoe and the brake head;

Fig. 7 is a front view of the mechanism disclosed in Fig. 6;

Fig. 8 is a perspective view of the main body of the brake head when constructed to receive the type of insert disclosed in Fig. 6;

Fig. 9 is a similar view of the insert section as disclosed in Fig. 6.

Referring more particularly to the drawings, there is disclosed in Fig. 1 a brake beam assembly comprising the usual brake beam 1, which is substantially channel shaped in cross section and to the ends of which are secured the brake heads 2 comprising the present invention. Each of these brake heads is formed from a casting composed of malleable iron or cast steel and embodies a substantially rectangular socket 3 shaped for the reception of the adjoining end of the brake beam 1. Within the socket 3, the brake head is formed with an angularly extending bearing 4 in which is positioned the complemental end of a tension rod 5 of standard design. This rod, as usual, has its ends threaded as at 6 for the reception of nuts 7 which cooperate with the surfaces 8 of the brake heads to retain the rod 5 under the required tension conditions. The brake beam assembly also includes a central strut 9 located between the central portions of the brake beam 1 and the tension rod 5, as is customary. One of the features of the present invention resides in forming the integral bearing 4 of each of the brake heads 2 so that said bearing will be split throughout a portion of its length. This split portion is formed with flanged enlargements 10 adapted for the reception of threaded fastening devices 11, by means of which the split portions of said bearings may be frictionally clamped into firm holding engagement with the adjoining portions of the tension rod 5, so that said tension rod may be firmly held in connection with the brake heads even though if for any reason the nuts 7 should become loosened or broken from connection with the tension rods. Failure of the rods 5 frequently occurs and with the use of customary construction, the tension rod is released and allowed to drop, thereby in many instances causing wrecks or car derailments. By the features of the present invention, the probabilities of such an accident are greatly minimized.

Integrally formed with the walls of the socket 3 and the bearing 4 of each brake head is a vertical reenforcing web 12 which terminates forwardly in an integral, transversely extending, substantially arcuate face 13, formed with spaced upper and lower sets of integral projections 14 and 15, between which is formed an arcuate key way 16. Provided in the face 13 midway of its length, and disposed between the projections 14 and 15, is a dovetailed recess 17, the walls of which slightly taper in a converging direction toward the inside of the brake head. Arranged to be removably received within the recess 17 is an insert section 18, the construction of which is shown more particularly in Figs. 2, 3, and 5. This insert section comprises a cast metal body provided with a tongue including flanges 19 which engage with and conform to the shape of the tapering walls of the recess 17. Centrally, the section 18 includes a rearwardly extending semicircular bearing web 20, which is seated within a similarily shaped socket 21 formed in the brake head and constituting a continuation of the central region of the recess 17. The bearing web 20 is adapted to receive the usual hangers, not shown, by means of which the brake beam is pivotally supported for swinging movement toward and away from associated car wheels. The insert section is additionally formed to include the integral upper and lower key receiving lugs or abutments 22 which, in the standard type of brake head, are integrally and inseparably formed with the body of the brake head. By this construction, it will be seen that the insert section may be forced from the outer surface of the brake head into its operative position within the recess 17 and the socket 21, the taper of the recess and socket walls serving to retain the insert section in proper operative alignment with the body of the brake head. In addition, the lugs 22 are provided with the usual vertically disposed and registering sockets or openings 23 which receive an arcuate brake shoe retaining key 24 of conventional design.

Associated with the brake head in the usual manner is a brake shoe 25 which has its inner surface provided with the usual apertured lug or yoke 26, which is arranged to be positioned between the lugs 22 and retained in such position by the key 24. The upper and lower ends of the brake shoe are provided with offset rearwardly extending projections 27 which register with the outer portions of the brake head projections 14 and 15. The locking key may be retained in place by a cotter pin 28, which passes transversely through openings formed in the upper set of projections 14 and overlies the offset upper end of the key 24.

With the use of this construction, when excessive wear takes place on the upper surface of the lower of the lugs 22, the insert section may be removed from association with the brake head by first removing the cotter pin 28 and the key 24. This allows the separation of the brake shoe 25 from the insert section and by outwardly directed pressures, delivered by a hammer or other percussion tool, the insert section containing the defective lower lug, may be driven from its wedged seating engagement with the recess 17 and the socket 21. It will be observed that this can be accomplished without removing the brake head from the brake beam, as has been required heretofore, or otherwise affecting the operating positions of the brake beam. Since, as stated, the greatest wear usually takes place on the lower lug, further use of the insert section may be obtained by merely reversing its position in an associated brake head so that the upper lug during initial operation by reversal in the arrangement of the insert section may be used as the lower lug. This can easily be accomplished by transferring the insert section from one side of the car to the other, thus adapting the insert section to the taper of its receiving sockets in the brake head proper and providing for maximum duration of service from each insert section. It will also be noted that these advantages are obtainable with minimum change in conventional railroad brake rigging.

The construction of the brake head comprising the present invention is applicable to standard brake beams, tension rods, brake shoes and shoe keys, the departures of the present invention from standard practice occurring entirely in the brake head itself. This enables the brake head comprising the present invention to be substituted for the standard brake head and used interchangeably therewith. The construction of the present brake head including its removable insert section enables brake head repairs to be made quickly, at low cost and without requiring the removal of railroad cars from service. Inasmuch as it has been my experience that brake beam failures are accountable for approximately ten per cent. of all cars being shopped for repairs on all the railroads, the savings afforded by the present invention with respect to both time and material will be evident.

A greater degree of protection to the brake head from brake shoe wear is afforded by the construction disclosed in Figs. 6 to 9 inclusive. In this form of my invention, the insert section 18a extends the full length of the face 13a of the brake head 2a so that the brake shoe 25 will not contact with the body of the brake head at any point, the wear being taken up on all points by the insert section 18a. This is accomplished by so forming the insert section 18a as to include the hook-shaped fingers 29 which slip over and engage with the projections 14a of the brake head 2a. The fingers 29 are united by transversely extending webs 30 which are so positioned relative to the openings 23a in the lugs 22a as to constitute guides for the reception of the key 24.

It will be understood by those skilled in the art that my improved brake head may be further modified to obtain the advantages above set forth without departing from the spirit and scope of the invention as the latter has been defined in the following claims.

What is claimed is:

1. A brake head for railway car trucks comprising a body formed to include a substantially arcuate forward wall, the said body having centrally formed therein a dove-tailed groove, a brake shoe attaching section shaped to conform to the curvature of said forward wall, said section being provided with a tongue formed to be slidably received in the groove of said body by movement of said section in a direction substantially parallel to the axle of an associated truck wheel, and spaced lugs integrally formed with and projecting forwardly from said section between which the lug of a cooperative brake shoe is positionable, the said lugs being formed for the reception of a key by which the brake shoe will be detachably connected with said section and said section positively maintained against transverse movement in connection with the body of the brake head.

2. In a brake head, a body provided with a forwardly disposed substantially arcuate wall, the said wall being formed with a transversely extending groove, a brake shoe attaching section formed to include a tongue arranged to be slidably received within said groove, spaced integral lugs projecting forwardly from said section, the said lugs being spaced to receive between them the lug of a cooperative brake shoe, and a key formed to pass through registering openings provided in the lugs of said section and said brake shoe to retain said brake shoe in secured connection with said section and to retain said section in secured relation with the body of the brake head.

3. A brake head for railway car trucks comprising a body having a substantially arcuate outer flange, said flange having its central region formed with an open-ended transversely disposed groove extending across the full width of the flange, a brake shoe attaching section substantially conforming to the curvature of said flange, said attaching section having its back surface provided with an integral transversely extending tongue formed to be slidably received in the groove of said body section by movement of the attaching section in a direction substantially parallel to the axle of an associated truck wheel, and vertically spaced lugs integrally formed with and projecting forwardly from the central portion of said attaching section and between which the attaching lug of a cooperative brake shoe is positionable, the said lugs being formed for the reception of a key by which the brake shoe is detachably connected with said attaching section.

4. A brake head for railway car trucks comprising a body section having a substantially arcuate forward wall, the central portion of said wall being formed with an open-ended groove, a wear-receiving insert section substantially conforming to the curvature of said forward wall, a tongue integrally formed with the back of said insert section and slidably receivable within said groove to prevent longitudinal separation of the body and insert sections, fingers integrally formed with the upper and lower ends of said insert section for slidable engagement with the upper and lower transverse edges of the forward wall of the body section, and vertically spaced abutments integrally formed with the central portion of said insert section for the reception of the securing lug of a brake shoe having its back surface engaged with said insert section, said abutments being apertured for the reception of a securing key arranged to pass through a corresponding opening formed in the attaching lug of the brake shoe.

5. A brake head for railway car trucks comprising a body section having an arcuate outer flange, a substantially arcuate brake shoe attaching section, a transversely disposed rib and groove connection separably uniting said sections, and vertically spaced abutments integrally formed with and projecting forwardly from the central portion of said attaching section for the reception of the attaching lug of a cooperative brake shoe disposed in engagement with the outer face of the attaching section, said abutments being provided with vertically aligned sockets disposed for registration with an opening formed in the attaching lug of the brake shoe.

6. A brake head for railway car trucks comprising a body section having an arcuate outer flange, a wear-receiving, substantially arcuate, insert section, transversely extending interfitting tongue- and groove-connection slidably and separably uniting said insert and body sections, spaced pairs of hook-shaped fingers integrally formed with the ends of said insert section to engage with the corresponding end edges of the flange of said body section, and vertically spaced abutments integrally formed with the forward central portion of said insert section, said abutments being spaced to receive between them the attaching lug of a brake shoe disposed in engagement with said insert section, said abutments being provided with vertically aligned openings for the reception of a securing key arranged to pass through said openings and a registering opening in the attaching lug of the associated brake shoe.

7. A brake head comprising a body section having an arcuate outer flange, an arcuate insert section separably connected with the outer surface of said flange, and vertically spaced abutments integrally formed with said insert section for the reception of the securing lug on the back of an associated brake shoe, said insert section between said abutments and to the rear thereof being provided with a horizontally extending groove for the reception of a hanger rod.

8. As a new article of manufacture, a wear-receiving insert section for brake heads comprising an integral metallic casting of substantially arcuate formation, vertically spaced abutments formed in the forward central part of said section, said abutments being provided with vertical openings for the reception of a brake shoe securing key, and a transversely extending attaching rib formed with the rear surface of said section for uniting the latter with an associated brake head.

9. As a new article of manufacture, a wear-receiving insert section for brake heads comprising an integral metallic casting of substantially arcuate formation, vertically spaced abutments formed in the forward central part of said section, said abutments being provided with vertical openings for the reception of a brake shoe securing key, and a transversely extending attaching rib formed in the rear part of said section for uniting the latter with an associated brake head, said section being further provided with a transversely extending, horizontally disposed opening to receive a hanger rod.

10. As a new article of manufacture, a wear-receiving insert section for brake heads comprising an integral metallic casting of substantially arcuate formation, vertically spaced abutments formed in the forward central part of said section, said abutments being provided with vertical openings for the reception of a brake shoe securing key, a transversely extending attaching rib formed in the rear part of said section for uniting the latter with an associated brake head, and spaced pairs of rearwardly directed hook-shaped fingers formed with the upper and lower ends of said insert section.

GEORGE A. SPILLER.